US011360807B2

(12) United States Patent
Azhakesan Sujatha et al.

(10) Patent No.: US 11,360,807 B2
(45) Date of Patent: Jun. 14, 2022

(54) CLONING A COMPUTING ENVIRONMENT THROUGH NODE RECONFIGURATION AND WITH NODE MODIFICATION

(71) Applicant: Oracle International Corporation, Redwood Shores, CA (US)

(72) Inventors: Aneesh Azhakesan Sujatha, Keralapuram (IN); Biju Narayanan, Trivandrum (IN); Hari Gopinathan Nair Indira Devi, Kumarapuram (IN); Jibu Thomas Thomas, Chenkottukonam (IN); Ravi Shankar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 16/895,812

(22) Filed: Jun. 8, 2020

(65) Prior Publication Data

US 2021/0081237 A1 Mar. 18, 2021

Related U.S. Application Data

(60) Provisional application No. 62/899,903, filed on Sep. 13, 2019.

(51) Int. Cl.

| | |
|---|---|
| ***G06F 9/48*** | (2006.01) |
| ***G06F 9/50*** | (2006.01) |
| ***H04L 41/084*** | (2022.01) |
| ***H04L 41/14*** | (2022.01) |
| ***H04L 41/0806*** | (2022.01) |
| ***H04L 41/12*** | (2022.01) |
| ***H04L 41/082*** | (2022.01) |
| ***H04L 41/22*** | (2022.01) |

(52) U.S. Cl.

CPC .......... *G06F 9/4868* (2013.01); *G06F 9/5072* (2013.01); *G06F 9/5077* (2013.01); *H04L 41/0846* (2013.01); *H04L 41/14* (2013.01); *H04L 41/082* (2013.01); *H04L 41/0806* (2013.01); *H04L 41/0843* (2013.01); *H04L 41/12* (2013.01); *H04L 41/22* (2013.01)

(58) Field of Classification Search

CPC .... G06F 9/4868; G06F 9/5072; G06F 9/5077; H04L 41/0846; H04L 41/14; H04L 41/0806; H04L 41/12; H04L 41/22; H04L 41/082; H04L 41/0843

See application file for complete search history.

(56) References Cited

U.S. PATENT DOCUMENTS 9,645,847 B1 * 5/2017 Roth ....................... G06F 9/461
9,882,929 B1 * 1/2018 Ettema .................. H04L 63/145

(Continued)

*Primary Examiner* — Michael W Ayers
(74) *Attorney, Agent, or Firm* — Invoke

(57) ABSTRACT

Techniques for cloning a computing environment while modifying components of the computing environment are disclosed. A cloning request specifies a modification to a source environment. A cloning engine determines one or more additional non-requested modifications to be made in a destination environment necessitated by the requested modification. A modified destination specification is generated including the requested modification and the one or more additional non-requested modifications. A destination stack is generated, and the destination environment is provisioned according to the destination stack.

24 Claims, 7 Drawing Sheets

(56) References Cited

U.S. PATENT DOCUMENTS

| | | | | |
|---|---|---|---|---|
| 10,430,216 | B1 * | 10/2019 | Loughmiller | G06F 3/067 |
| 10,705,920 | B1 * | 7/2020 | Holenstein | G06F 16/27 |
| 2016/0139962 | A1 * | 5/2016 | Tsirkin | G06F 9/45558<br>718/1 |
| 2019/0324785 | A1 * | 10/2019 | Weissman | G06F 9/45558 |
| 2019/0334909 | A1 * | 10/2019 | Schmitt | G06F 3/0659 |

* cited by examiner

| Node Type | Shape Name | Operating System | Node Description | Select to Clone |
|---|---|---|---|---|
| 1. Database Tier | VM.Std.2.2 | Linux | | Yes |
| 2. Middle Tier A | VM.Std.2.2 | Linux | AppServer | Yes |
| 3. Middle Tier B | VM.Std.2.2 | Linux | AppServer | No |
| 4. Client Application | VM.Std.2.2 | Windows | | Yes |
| 5. Elastic Search Server | VM.Std.2.2 | Linux | | Yes |

FIG. 6

DISPLAY 712
INPUT DEVICE 714
CURSOR CONTROL 716
MAIN MEMORY 706
ROM 708
STORAGE DEVICE 710
BUS 702
PROCESSOR 704
COMMUNICATION INTERFACE 718
700
NETWORK LINK 720
728
INTERNET
ISP
726
SERVER 730
LOCAL NETWORK 722
HOST 724

CLONING A COMPUTING ENVIRONMENT THROUGH NODE RECONFIGURATION AND WITH NODE MODIFICATION

This application claims the benefit of U.S. Provisional Patent Application 62/899,903, filed Sep. 13, 2019, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloning computing environments. In particular, the present disclosure relates to cloning a computing environment with component and node modification.

BACKGROUND

A computing environment may include a large number of components, including compute nodes and application nodes. Generally, nodes refer to systems or devices connected to another system or device. Compute nodes include, for example, physical machines, virtual machines (VMs), data storage. Application nodes include, for example, end-user applications, user interfaces, database applications, middleware applications, search engine applications. Each node is associated with a set of configurations. The configurations affect how the nodes are implemented (such as, node type, shape, disk space, domain, subnet). Additionally, or alternatively, the configurations affect how the nodes communicate with each other (such as, dependencies, Internet Protocol (IP) address of a node itself, IP addresses of dependent or requisite nodes).

Cloning a computing environment involves generating a new computing environment based on a copy of an existing computing environment. Cloning may be necessary for increasing redundancy and therefore resiliency for a production environment. Additionally, or alternatively, cloning may be necessary for producing a test environment or demonstrative (demo) environment based on a production environment. However, due to the large number of nodes and configurations of a computing environment, cloning may require a large amount of time and resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a GUI for selecting nodes of a computing environment to be cloned in accordance with one or more embodiments.

DETAILED DESCRIPTION

Figure 1:
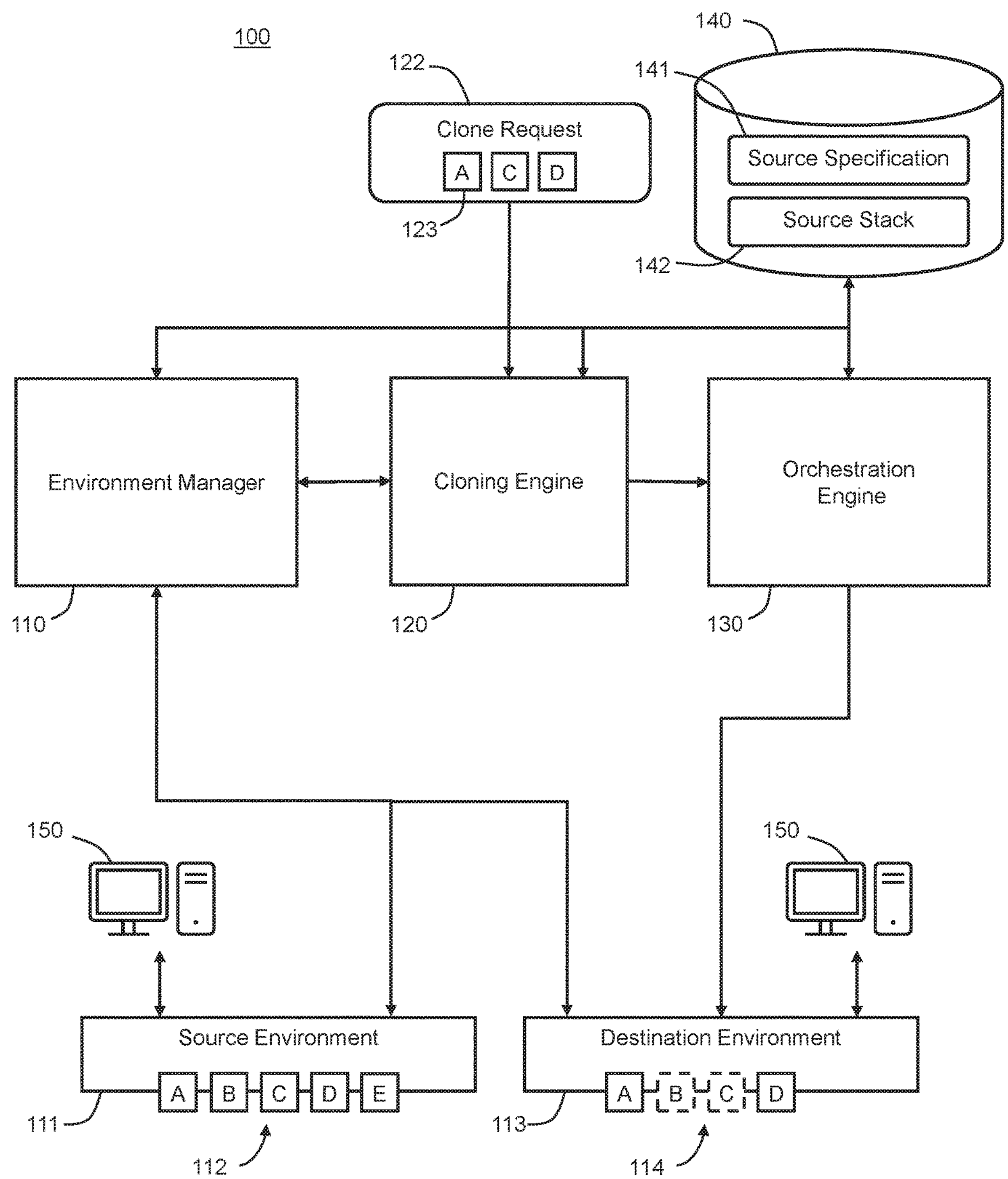
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CLONING SYSTEM ARCHITECTURE
3. CLONING A COMPUTING ENVIRONMENT WITH COMPONENT MODIFICATION
4. EXAMPLE EMBODIMENT OF A USER INTERFACE
5. COMPUTER NETWORKS AND CLOUD NETWORKS
6. MISCELLANEOUS; EXTENSIONS
7. HARDWARE OVERVIEW

1. General Overview

A computing environment may be described by a specification and a stack. A specification, as referred to herein, specifies components of a computing environment and configurations corresponding to the components. A stack, as referred to herein, identifies hardware interconnections that implement the configurations of the components identified by a specification.

One or more embodiments generate a modified clone of a source computing environment. A system generates the modified clone of a source computing environment based on (a) a source specification corresponding to the source environment, (b) a source stack corresponding to the source environment, and (c) a modification request that modifies a component or a configuration of the source environment. Cloning the source computing environment includes determining and implementing an additional non-requested modification(s), for a destination environment, that are necessitated by a requested modification(s).

One or more embodiments generate a destination specification for a destination environment, in accordance with a modification request, by removing a particular component from a copy of the source specification. Generating the first destination specification includes implementing at least one additional modification to the copy of the source specification based on dependencies of the particular component. The additional modification may include, for example, (a) removing an additional component, from the copy of the source specification, that has a dependency relationship with the removed, particular component, (b) modifying a storage capacity of other components of the destination specification, or (c) modifying a compute capacity of other components of the destination specification. A destination stack may be generated based on the destination specification. In addition, or in the alternative, the destination stack is generated by modifying the source stack. The destination environment is provisioned and deployed according to the destination stack.

In an embodiment, the system copies the data volumes of a source computing environment, storing application binary files and application data of the application nodes, into a destination environment. An orchestration engine provisions new compute nodes in the destination environment. The orchestration engine attaches the copied application nodes to the newly-provisioned compute nodes. The orchestration engine reconfigures the application nodes based on a destination stack in order to update the addresses, ports, and communication channels used by the application nodes. Hence, cloning is efficiently performed using a destination stack generated based on a source environment specification that includes a source topology and a source template. Generating the destination stack does not necessarily involve the lengthy process of analyzing the data volumes (or the binary files or application data stored therein) of the source environment. Additionally, cloning is efficiently performed without a full provisioning process. Application nodes are copied from the source environment to the destination environment and usable after reconfiguration.

One or more embodiments described in this Specification and/or recited in the claims may not be included in this General Overview section.

2. Cloning System Architecture

In one or more embodiments, a computing environment may be implemented in a cloud network. Embodiments and/or examples relating to computer networks are described below in Section 5, titled "Computer Networks and Cloud Networks."

In one or more embodiments, a computing environment includes a set of compute nodes. A compute node is a resource on which an application node is executed. Examples of compute nodes include a physical machine, a virtual machine (VM), and a data storage device.

Each compute node is associated with a set of configurations. Various compute node configurations may be used.

A compute node configuration may include an operating system (OS). Examples of OS's include Linux and Windows.

A compute node configuration may be based on application nodes to be deployed. For example, one option for a compute node configuration may be a database (DB) system, which is a system for running a general database. Another option for a compute node configuration may be database applications, which is an application-specific database on top of a database system. Another option for a compute node configuration may be a search application, which is an application for searching a database application. Another option for a compute node configuration may be full-tier application nodes, which includes a database, an application server, and a web server. Another option for a compute node configuration may be middle-tier application nodes, which includes an application server, and a web server. Another option for a compute node configuration may be a client, which includes client components used to deploy a computing environment.

A compute node configuration may be described as having a node shape. If the node is a VM, then the node may be associated with a VM shape. If the node is a bare metal (BM) system, then the node may be associated with a bare metal shape.

A compute node configuration may characterize a size of a disk space, such as 256 GB, 512 GB, 1024 GB, or any other size.

In one or more embodiments, a computing environment includes a set of application nodes. An application node executes on a compute node. Examples of application nodes include a DB application, an application server, a web server, a search application. A particular set of one or more application nodes may be specified in a deployment package (DPK). In the present specification and claims, the term "components" may refer to both compute nodes and application nodes. In other words, the term "component of a computing environment" refers to compute nodes or application nodes in the computing environment, and to the devices, systems, connections, and applications that make up the compute nodes and application nodes in the computing environment.

Each application node is associated with a set of configurations. Various application node configurations may be used. An application node configuration may be a subnet used for implementing the application node. The subnet may be part of a cloud network used for implementing the computing environment as a whole.

Application node configurations may include a region and an availability domain. A region is a localized geographic area, and an availability domain is one or more data centers located within a region. A region is composed of several availability domains.

Application node configurations may include a subnet, a listener port number, a connect identifier (ID), a Uniform Resource Identifier (URI) or file path, an operator ID, an access ID, a DB name, a Pluggable Database name, an administrator username, a web server domain, an authentication domain, a hypertext transfer protocol (HTTP) port, a hypertext transfer protocol secure (HTTPS) port, a Jolt port, a WSL port.

In one or more embodiments, a computing environment is implemented on using one or more data volumes. The data volumes store binary files and/or application data associated with compute nodes and/or application nodes. Binary files include executable code of a compute node and/or an application node. Application data includes data obtained by a compute node and/or an application node through an application programming interface (API) and/or user interface. Application data also includes data derived from other data obtained by a compute node and/or an application node through an application programming interface (API) and/or user interface. As an example, for an application node executing a human capital management application, application data may include names and biographical information of employees of a company, and a number of employees per office location. As another example, for an application node executing a financial management application, application data may include financial transactions of a company, and a balance of the company.

In one or more embodiments, an environment manager is configured to manage a computing environment. An environment manager is configured to receive a specification of a topology and a template. The topology and template for an environment may be referred to as the environment specification. The topology and/or template may be specified via user input. A topology includes definitions of a set of compute nodes to be implemented in a computing environment. A template includes definitions of a set of application nodes to be implemented in a computing environment. The template may also specify which topology to be used in conjunction with the specified application nodes. The topology and the template may be separate documents or may be the same document. The topology and template may be in the same format or different formats. An example format for a topology or a template is JavaScript Object Notation (JSON). The term "specification" may be used herein to refer to one or more documents specifying the compute nodes and the application nodes of a computing environment.

An environment manager is associated with a cloning engine. A cloning engine refers to hardware and/or software configured to perform operations described herein for cloning a computing environment through node reconfiguration and/or with node modification. Examples of operations for cloning a computing environment through node reconfiguration and/or with node modification are described below with reference to FIGS. 1-4.

A cloning engine is configured to receive a clone request. The clone request may be made via user input. As used herein, the term "source environment" may refer to an existing computing environment that is cloned to generate a new computing environment. The term "destination environment" may refer to a new computing environment that is cloned from an existing computing environment. The clone request may specify modifications for a copy of a source environment during a cloning process. The modifications may include removing a node that is in the source environment from the destination environment. Additionally, or alternatively, the modifications may include providing different configurations for a node in the destination environment than in the source environment.

An environment manager and/or cloning engine are associated with one or more user interfaces. A user interface refers to hardware and/or software configured to facilitate communications between a user and an environment manager. A user interface renders user interface elements for presenting and receiving information to and from a user. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, an orchestration engine is configured to provision a computing environment. The orchestration engine is configured to receive and/or generate a stack that includes necessary information for provisioning compute nodes and application nodes for a computing environment. A stack may be a separate document from the topology and the template. An example format for a stack may be JSON. The orchestration engine is configured to determine a sequence for provisioning the nodes based on the stack. The orchestration engine is configured to execute the provisioning operations based on the determined sequence.

In one or more embodiments, a topology, a template, and/or a stack may be stored in a data repository. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as an environment manager and/or orchestration engine. Alternatively, or additionally, a data repository may be implemented or executed on a computing system separate from an environment manager and/or orchestration engine. The data repository may be communicatively coupled to the environment manager and/or orchestration engine via a direct connection or via a network.

In an embodiment, an environment manager, orchestration engine, and/or cloning engine is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Cloning a Computing Environment with Component Modification

FIG. 1 illustrates a system 100 in accordance with one or more embodiments. As illustrated in FIG. 1, system 100 includes an environment manager 110 associated with a cloning engine 120, an orchestration engine 130, and a data repository 140. One or more of the environment manager 110, the cloning engine 120, and the orchestration engine 130 may be part of the same computing system, computing device (e.g. situated within the same computing tower or rack), or application, or they may be separate devices or systems in communication with each other. For example, in one embodiment, the environment manager 110 is comprised of a computer program running on a computer that causes the computer to control one or more computing environments.

The data repository 140 includes any type of storage unit and/or device (e.g., a file system, database, collection of tables, or any other storage mechanism) for storing data. Further, the data repository 140 may include multiple different storage units and/or devices. The multiple different storage units and/or devices may or may not be of the same type or located at the same physical site.

The environment manager 110 is configured to manage the source computing environment 111 and a destination environment 113. Generating the source computing environment 111 involves a defining a set of nodes for the computing environment and provisioning the set of nodes. Nodes include devices, systems, and applications running on devices and systems, that are connected to other devices, systems, and applications. The environment manager 110 receives a specification of a topology, defining a set of nodes for a computing environment 111. The nodes may include compute nodes. Compute nodes include computing devices and applications including storage, networking connections, memory, and processing resources to be consumed by applications and virtual machines to perform functions of the applications and virtual machines.

The environment manager 110 receives a specification of a template, defining a set of application nodes for the computing environment 111. The application nodes include applications and virtual machines that execute on compute nodes. Together, a topology and a template define a source environment specification 141 that serves as a blueprint for the source computing environment 111. Using the environment specification 141, a system 100 including an environment manager 110 may generate multiple instances of the computing environment. User terminals or systems 150 access the nodes or components 112, 114 of the source environment 111 and the destination environment 113 to perform operations, such as running or accessing data, networks, applications, running virtual machines, etc.

Based on the environment specification 141, the environment manager 110 generates a source stack 142. The source stack 142 provides necessary information for provisioning the nodes. The source stack 142 specifies the compute nodes and the application nodes for the computing environment, the dependencies between the nodes, the addresses, ports, and communication channels, and any other hardware interconnections and resources used by the nodes. The source stack 142 may also specify login information and access passwords associated with the nodes. Based on the source stack 142, the orchestration engine 130 provisions the nodes, including determining a sequence for provisioning the nodes. In this manner, the environment manager 110 and the orchestration engine 130 generate an instance of the computing environment, such as the source environment 111 of FIG. 1.

Embodiments of the invention include cloning a computing environment. The cloning engine 120 receives a request 122 to clone the source environment 111. The clone request 122 may be made via user input. The clone request 122 may specify modifications for a copy of a source environment during a cloning process. The cloning engine 120 includes functionality for determining whether a clone request includes changes to a topology of a source environment.

The modifications may include removing a particular node that is in the source environment 111 from the destination environment 113. Additionally, or alternatively, the modifications may include providing different configurations, memory capacity, or computing capacity for a particular node in the destination environment 113 than in the source environment 111. In the embodiment in FIG. 1, the request 122 includes components 122 (A, B, D) from the source environment that the user wants to keep in a destination environment 113. In embodiments of the invention, the components 122 may be different than the components 112 of the source environment 111. In the example in FIG. 1, the components 122 in the clone request include fewer components (A, C, D) than the components 112 (A, B, C, D, E) in the source environment 111. In embodiments of the invention, the components 122 and 112 may correspond to nodes in the environments, such as compute nodes and application nodes.

The cloning engine 120 receives the source specification 141 from the data repository 140 and compares the clone request 122 with the source specification 141 to determine whether the cloning request 122 includes any changes to the configuration of the source environment 111 to generate the destination environment 113. The modifications may include reducing the number of nodes in the copy of the source environment. As an example, a source environment may include Node A, Node B, and Node C. A user may request cloning the source environment to generate a destination environment that includes the same Node A and Node B, without including Node C. In this example, the clone request selects only Node A and Node B to be cloned. The clone request includes a modification that reduces the number of nodes in the copy of the source environment to be generated.

Additionally, or alternatively, the modifications may include changing the size or requirements of the nodes in the copy of the source environment. As an example, a source environment may include Node A and Node B. Node A in the source environment may be associated with a Windows OS, full-tier application nodes, and a disk size of 256 GB. Node B in the source environment may be associated with an application server, and the subnet ocid1.subnet.oc1.abcde. A user may request cloning the source environment to generate a destination environment that includes Node A and Node B, but with modified configurations. The desired Node A in the destination environment may be associated with a Windows OS, middle-tier application nodes, and a disk size of 1024 GB. The desired Node B in the destination environment may be associated with an application server, and the subnet ocid2.subnet.oc2.abcde. In this example, the clone request includes configuration modifications to one or more nodes in the copy of the source environment.

If no modifications are requested, the source environment 111 may be cloned in its entirety. On the other hand, if the cloning engine 120 determines that changes are requested to the source environment 111 to generate the destination environment 113, the cloning engine 120 determines whether the clone request 122 results in a valid destination environment 113.

The cloning engine 120 includes functionality to determine whether additional non-requested modifications are necessitated by the requested modifications. For example, the cloning engine 120 may determine that a component 123 present in the clone request 122 depends for its functionality on a component in the source environment 111 that is not present in the clone request 122. In this example, one component 112 in the source environment 111 may be a compute node and another component 112 may be an application node configured to run on the compute node. The cloning engine 120 may determine that the clone request 122 includes the application node but does not include the compute node, resulting in an invalid destination environment 113.

As another example, the cloning engine 120 may determine that the clone request 122 includes a change in a shape of a component 123 resulting in a reduced memory or processing capacity. The cloning engine 120 may further determine that the reduction in memory or processing capacity would not allow the component 123 to function according to its configuration in the specification, or that the reduction in the memory or processing capacity would not allow the component to run an application according to its specification. Any change to the source environment 111 that would result in one or more components 114 in the destination environment being incapable of functioning according to their specifications may result in the cloning engine 120 determining the clone request 122 as being invalid, or as requiring modification.

If the modification in the clone request 122 would result in an invalid destination environment 113 or would require further modifications to allow each component 114 in the destination environment to function, then the cloning engine 120 may perform a non-requested modification to the clone request 122 to result in a valid, or fully functional, destination environment 113. In the present specification and claims, a "non-requested" modification to a clone request includes a modification to the destination specification, stack, and/or environment that was not present in the clone request, but that is necessitated by the clone request.

In an embodiment in which the cloning engine 120 generates a preliminary destination specification based on the clone request 122, modifying the clone request 122 to result in a fully functional destination environment includes further modifying the preliminary destination specification to generate an updated destination specification.

In an embodiment in which the clone request 122 omits a component 112 from the source specification 141 on which another component 123 depends for its functionality, the cloning engine may automatically modify the clone request 122 to (1) re-include the omitted component in the clone request 122, (2) omit the dependent component from the clone request 122, or (3) modify dependencies or characteristics of one or more components in the clone request 122 to facilitate the functionality of each component 123 in the clone request 122.

For example, referring to FIG. 1, the clone request 122 includes components 123 (A, C, and D) from among the components 112 (A, B, C, D, and E) of the source environment 111. The clone request 122 omits components 112 (B, D, and E) from the source environment 111. If the cloning engine 120 determines that component A relies on component B for its functionality, the cloning engine may (1) re-include component B into the clone request 122 so that the component B will be present in the destination environment 113, (2) omit component A from the clone request 122 to remove the dependency, resulting in component A being absent from the destination environment 113, or (3) modify the characteristics of one or more of components A, C, and D in the clone request 122 to allow component A to function without component B. Changing characteristics of components A, C, or D may include, for example, changing a dependency of component A from component B to component C or D, or changing computing or storage capacities of components A, C, or D.

The cloning engine 120 generates a destination specification, including one or more destination environment topologies and one or more destination environment templates, by modifying the source specification 141 according to the clone request 122, after the clone request has been validated by the cloning engine 120. If the cloning engine 120 determined that the cloning request 122 needed to be modified from its original form, the cloning engine 120 may make the necessary modifications to the destination specification. In one embodiment, the cloning engine 120 generates the destination specification by only changing portions of the source specification 141 that are modified by the clone request 122 and the further modification determined necessary by the cloning engine 120.

In one embodiment, the cloning engine 120 provides a destination specification to the orchestration engine 130 to generate a destination stack. In an alternative embodiment, the cloning engine 120 generates the destination stack and provides the destination stack to the orchestration engine 130 to provision the destination environment 113. The destination stack that includes necessary information for provisioning the components 114 of the destination environment 113. In FIGS. 1-4, the dashed lines around components 114 (B and C) in the destination environment 113 represent example components that may be added (B) or omitted (C) based on the validation performed by the cloning engine 120. The cloning engine 120 may also use the source stack 142 to generate the destination stack. In one embodiment, the cloning engine 120 identifies changes to the source stack 142 that would be necessitated by the clone request 122 or the updated destination specification, and modifies a copy of the source stack to generate the destination stack.

In one embodiment, the cloning engine 120 obtains configuration details such as port numbers, computing devices, memory devices and addresses, from the source stack 142 and copies the configuration details into the destination stack. In one embodiment, the cloning engine 120 obtains information such as system topology (e.g. which nodes are to be included or omitted) from the destination specification and generates the destination stack according to the topology information in the destination specification. In other words, in various embodiments, the cloning engine 120 uses one or both of a copy of the source stack 142 and the destination specification to generate a destination stack for provisioning the destination environment 113.

The destination stack specifies the components 114, such as compute nodes and application nodes, for the destination environment, the dependencies between the nodes, and the addresses, ports, and communication channels used by the nodes. The destination stack may also specify login information and access passwords associated with the nodes.

The orchestration engine 130 determines a sequence for provisioning the components of the destination environment 113 based on the destination stack. The orchestration engine 130 is configured to execute the provisioning operations based on the determined sequence. The orchestration engine 130 processes the destination stack to determine various dependencies between the components 114 of the destination environment 113. In one embodiment, the orchestration engine 130 determines a sequence for provisioning the components 114 based on the dependencies. For example, the orchestration engine 130 may first provision a first compute node, among the components 114, with no requisite nodes. Then, the orchestration engine 130 may provision compute nodes, among the components 114, with dependencies on the first compute node.

Provisioning compute nodes among the components 114 may include allocating hardware resources for the compute node, booting or spinning up the compute node, initializing the compute node. If the compute node is a VM, provisioning a VM may include transmitting a request to a hypervisor to spin up the VM. If the compute node is a DB system, provisioning a DB system may include transmitting a request to a cloud manager to start the DB system on a cloud network.

The orchestration engine 130 may provision the destination environment 113 by cloning selected components 123, as indicated by the clone request 122, from the source environment 111 to the destination environment 113. The cloning engine 120 identifies the components selected for cloning based on the clone request 122. If the clone request 122 does not request removal of any components from the copy of the source environment, then the components selected for cloning include all components of the source environment 111. If the clone request 122 specifies removal of one or more components from the copy of the source environment, then the components selected for cloning include the remaining components of the source environment 112.

In one embodiment, the cloning engine 130 clones a component from the source environment 111 to the destination environment 113 by making an exact copy of the binary files and data associated with the component. As an example, an application node may include binary files for one or more applications, including an end-user application and/or an intermediary application that works with an end-user application. The application node may further include application data for the applications. The application data may include data entered by a user and/or data determined by one or more applications.

In one embodiment, the cloning engine 130 clones a component from the source environment 111 to the destination environment 113 by copying configurations associated with the component. Such configurations may include the addresses, ports, and communication channels associated with the component, the subnet on which the component is implemented, the domain in which the component operates, the set of applications that work together to deliver a particular service, and/or the login information and access passwords associated with the component.

In one embodiment, the orchestration engine 130 provisions the destination environment 113 by attaching cloned application nodes to provisioned compute nodes in the destination environment 113. Hence, each cloned application node executes on one or more of the provisioned compute nodes in the destination environment 113.

In one embodiment, the orchestration engine 130 reconfigures the cloned application nodes in the destination environment based on the destination stack. For example, the orchestration engine 130 determines the configurations for each node as specified by the destination stack. The orchestration engine 130 determines whether the specified configurations match the copied configurations for a particular cloned application node. If there is no match, the orchestration engine reconfigures the particular cloned application node using the specified configurations.

As an example, a source environment 111 may include Node A. An exact copy of Node A is reproduced in a destination environment 113. However, a destination stack may specify a different IP address for Node A in the destination environment, than that used by Node A in the source environment. The destination stack may specify a different IP address for a web server that communicates with Node A in the destination environment 113, than that used by the web server in the source environment 111. An orchestration engine 130 may reconfigure Node A in the destination environment 113 using (a) the IP address for Node A specified in the destination stack and (b) the IP addresses for the web server specified in the destination stack.

As another example, a source environment 112 may include Node A. An exact copy of Node A is reproduced in a destination environment 113. However, a destination stack may specify a different access password for Node A in the destination environment 113, than that used by Node A in the source environment 111. The orchestration engine 130 may reconfigure Node A in the destination environment 113 using the access password for Node A specified in the destination stack.

As another example, a source environment 111 may include Node A. An exact copy of Node A is reproduced in a destination environment 113. However, a destination stack may specify a different shape for Node A in the destination environment 113, than that used by Node A in the source environment 111. The orchestration engine 130 may reconfigure Node A in the destination environment 113 using the shape for Node A specified in the destination stack.

In one embodiment, the orchestration engine 130 validates the destination environment 113 instantiated based on the destination stack. The orchestration engine 130 may, for example, run tests on the destination environment 113. The orchestration engine 130 may, for example, check whether any required dependencies of nodes in the destination environment 113 are not satisfied. The orchestration engine 130 may, for example, perform a same set of operations on the source environment 111 and the destination environment 113 and compare the results generated by the operations.

In embodiments of the invention, the destination specification and the destination stack may be stored in the same data repository 140 as the source specification 141 and the source stack 142 or in a separate data repository from the source specification 141 and the source stack 142.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, one or both of the environment manager 110 and the cloning engine 120 includes a user interface, including hardware and/or software configured to facilitate communications between a user and the system 100. The user interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the interface is specified in one or more other languages, such as Java, C, or C++.

In an embodiment, the environment manager 110, the cloning engine 120, and the orchestration engine 130 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
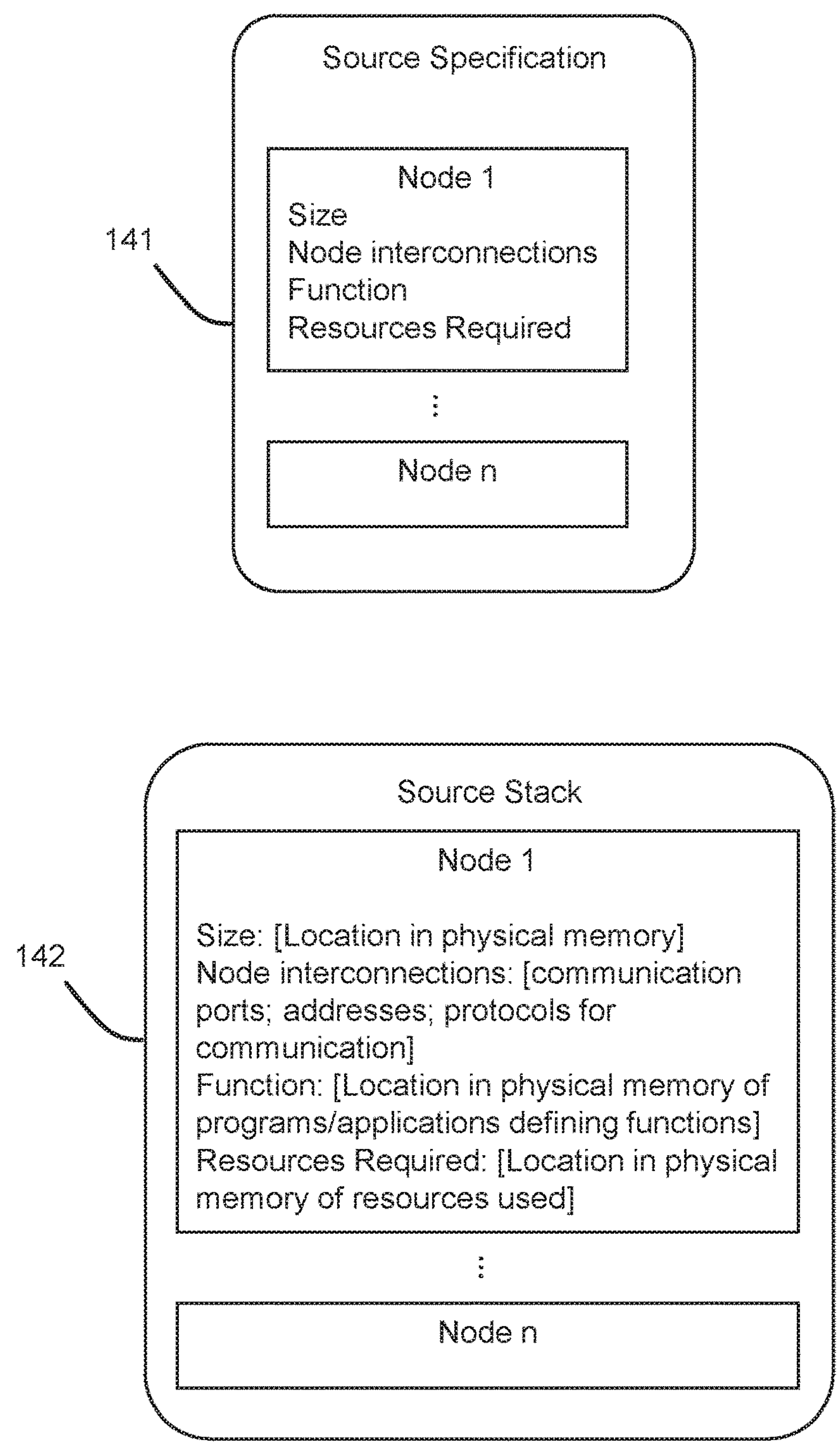
FIG. 2 illustrates a source environment specification and stack in accordance with one or more embodiments.

FIG. 2 illustrates information present in a source environment specification 141 and stack 142 in accordance with one or more embodiments. The source specification 141 includes at least one source topology and/or at least one source template describing a topology of the source environment and templates to be applied to the source environment. The source topology defines a set of nodes for the computing environment. The nodes may include compute nodes. Compute nodes include computing devices and applications including storage, networking connections, memory, and processing resources to be consumed by applications and virtual machines to perform functions of the applications and virtual machines. The template defines a set of application nodes for the computing environment. The application nodes include applications and virtual machines that execute on compute nodes. Together, the topology and the template define the environment specification that serves as a blueprint for the computing environment, such that multiple instances of the computing environment may be generated.

The source stack 142 specifies the compute nodes and the application nodes for the source environment, the dependencies between the nodes, the addresses, ports, and communication channels, and any other hardware interconnections and resources used by the nodes. The source stack 142 may also specify login information and access passwords associated with the nodes. While FIG. 2 shows example embodiments of elements of a source specification 141 and source stack 142, the destination specification and destination stack are similarly constructed.

Figure 3:
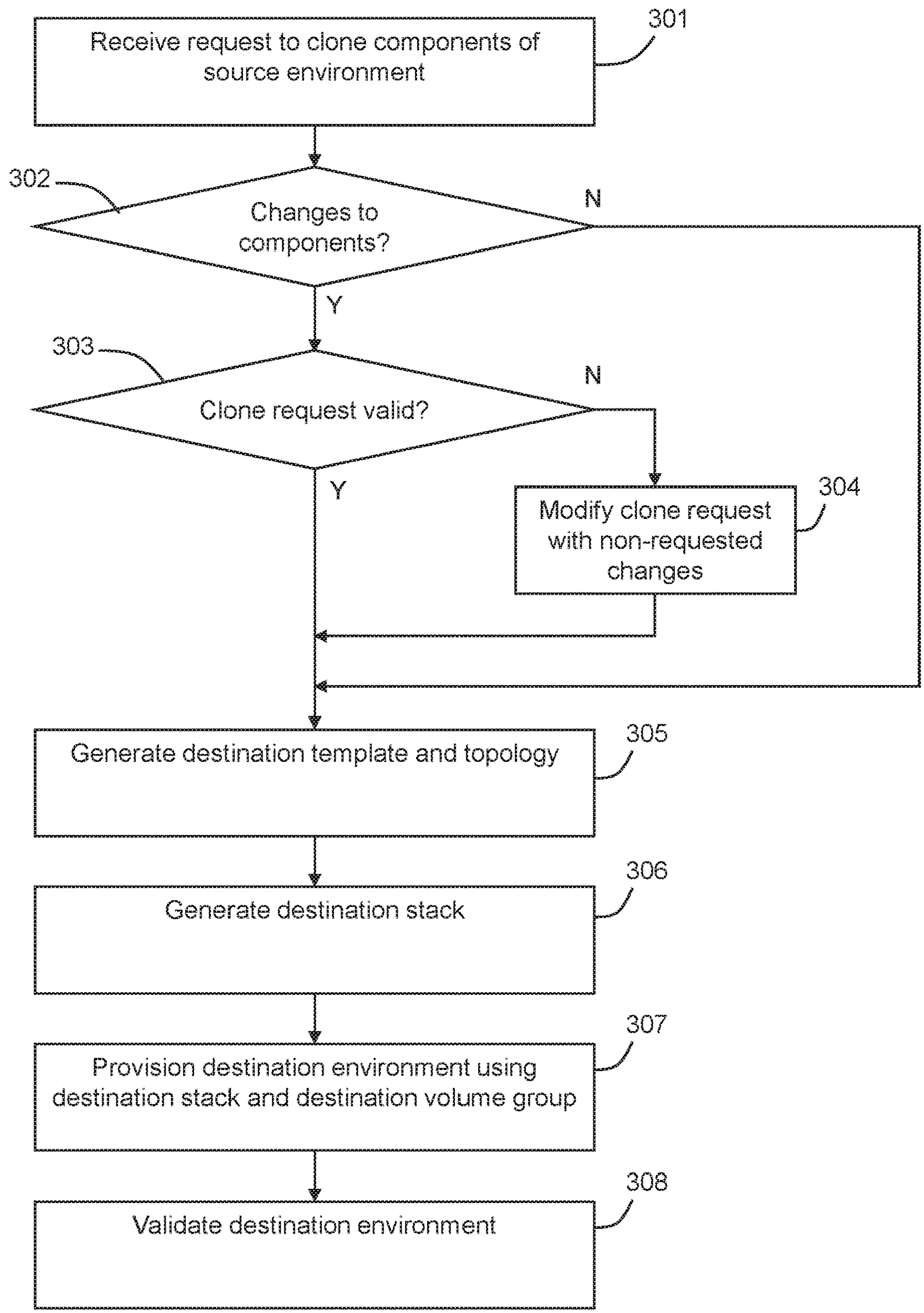
FIG. 3 illustrates an example set of operations for cloning a computing environment in accordance with one or more embodiments.

FIG. 3 illustrates an example set of operations for cloning a computing environment according to an embodiment of the invention. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, the system receives a request to clone a source environment (Operation 301). The request may be received by a cloning engine or by an environment manager having a cloning capability. The clone request may be provided by user input via a user interface or via another computer system executing a program requiring the cloning. The request identifies a source environment to be cloned.

The system determines whether the clone request includes modifications to the source environment (Operation 302). The environment manager or cloning engine may determine whether the clone request includes modifications to the source environment. Modifications may include omitting a particular component or node that is in the source environment from the destination environment or adding a component or node, that is not in the source environment, to the destination environment. Additionally, or alternatively, modifications may include providing different configurations for a particular component or node in the destination environment than in the source environment.

In one embodiment, a cloning engine determines whether modifications are made to the source environment by obtaining a copy of the source specification, modifying the source specification based on the cloning request, and comparing the modified source specification with an un-modified copy of the source specification. In an alternative embodiment, a cloning engine compares a source stack with the either the clone request or the modified source specification to determine whether the modifications to the source stack would result in a valid destination stack and a valid (or optimally functioning) destination environment. In yet another embodiment, the cloning engine compares both the source specification and the source stack with either the clone request or the modified source specification.

If no modifications are requested, a cloning engine may clone a source specification without modifying a topology of the source specification. A cloning engine generates a destination specification (Operation 305). The destination specification includes a destination environment topology and one or more templates.

On the other hand, if the cloning engine determines that the clone request would result in modifying the source specification, the cloning engine performs an additional analysis to determine whether the clone request would result in a valid destination environment (Operation 303). For example, the cloning engine determines whether the nodes in the destination environment would be able to function according to specifications.

In one embodiment, the cloning engine determines that a cloning request is invalid or requires modification based on determining that a component present in the clone request depends for its functionality on a component in the source environment that is not present in the clone request. For example, one component in the source environment may be a compute node and another component may be an application node configured to run on the compute node. The cloning engine may determine that the clone request includes the application node but does not include the compute node, resulting in an invalid destination environment, or a destination environment in which the nodes could not function properly.

As another example, the cloning engine may determine that the clone request includes a change in a shape of a component resulting in a reduced memory or processing capacity. The cloning engine may further determine that the reduction in memory or processing capacity would not allow the component to function according to its configuration in the specification, or that the reduction in the memory or processing capacity would not allow the component to run an application according to its specification. Any change to the source environment that would result in one or more components in the destination environment being incapable of functioning according to their specifications may result in the cloning engine determining, in operation 303, the clone request as being invalid, or as requiring modification.

If the modification in the clone request would result in an invalid destination environment or would require further modifications to allow each component in the destination environment to function optimally, then the cloning engine may modify the clone request (to result in a valid, or optimally functional, destination environment with non-requested changes (Operation 304). In the present specification and claims, non-requested changes are changes to a destination specification and/or stack that were not requested in the clone request.

For example, in an embodiment in which the clone request omits a component from the source specification on which another component depends for its functionality, the cloning engine may automatically modify the clone request to (1) re-include the omitted component in the clone request, (2) omit the dependent component from the clone request, or (3) modify dependencies or characteristics of one or more components in the clone request to facilitate the functionality of each component in the clone request.

The cloning engine may modify a topology or template document of a preliminary destination specification, which has been generated according to the clone request, to generate an updated destination specification (Operation 305).

The cloning engine generates a destination stack using a destination specification (Operation 306). In an alternative embodiment, the cloning engine transmits the destination specification to an orchestration engine, and the orchestration engine generates the destination stack. In one embodiment, the cloning engine modifies the clone request by modifying a source stack to generate a portion of the destination stack (Operation 306). In one embodiment, the cloning engine generates the destination specification, including one or more destination environment topologies and one or more destination environment templates, by modifying the source specification and/or the source stack according to the clone request, and according to any further modification that may be required to generate a valid destination environment. The environment manager, the cloning engine, or the orchestration engine may generate the destination stack based on one or both of the modified the destination specification and the source stack.

In one embodiment, the environment manager, the cloning engine, or the orchestration engine identifies changes to the source stack that would be necessitated by the clone request or the destination specification, and modifies a copy of the source stack to generate the destination stack.

In one embodiment, the environment manager, the cloning engine, or the orchestration engine obtains configuration details such as port numbers, computing devices, memory devices and addresses, from the source stack copies the configuration details into the destination stack. The destination specification provides a system topology (e.g. which nodes are to be included or omitted) and the cloning engine generates the destination stack according to the topology information in the destination specification. In other words, in various embodiments, the environment manager, the cloning engine, or the orchestration engine uses one or both of a copy of the source stack and the destination specification to generate a destination stack for provisioning the destination environment (Operation 306).

The orchestration engine provisions a destination environment based on the information in the destination stack (Operation 307).

The destination stack specifies the components, such as compute nodes and application nodes, for the destination environment, the dependencies between the nodes, and the addresses, ports, and communication channels used by the nodes. The destination stack may also specify login information and access passwords associated with the node.

The orchestration engine determines a sequence for provisioning the components of the destination environment based on the destination stack. The orchestration engine is configured to execute the provisioning operations based on the determined sequence. The orchestration engine processes the destination stack to determine various dependencies between the components of the destination environment. In one embodiment, the orchestration engine determines a sequence for provisioning the components based on the dependencies.

In one embodiment, the orchestration engine provisions compute nodes among the components by allocating hardware resources for the compute node, booting or spinning up the compute node, or initializing the compute node. If the compute node is a VM, the orchestration engine may provision the VM by transmitting a request to a hypervisor to spin up the VM. If the compute node is a DB system, provisioning a DB system may include transmitting a request to a cloud manager to start the DB system on a cloud network.

The orchestration engine provisions the destination environment by cloning selected components, as indicated by the clone request, from the source environment to the destination environment. The cloning engine identifies the components selected for cloning based on the clone request. If the clone request does not request removal of any components from the copy of the source environment, then the components selected for cloning include all components of the source environment. If the clone request specifies removal of one or more components from the copy of the source environment, then the components selected for cloning include the remaining components of the source environment.

The cloning engine clones a component from the source environment to the destination environment by making an exact copy of the binary files and data associated with the component. As an example, an application node may include binary files for one or more applications, including an end-user application and/or an intermediary application that works with an end-user application. The application node may further include application data for the applications. The application data may include data entered by a user and/or data determined by one or more applications.

The cloning engine also copies configurations associated with the component. Such configurations may include the addresses, ports, and communication channels associated with the component, the subnet on which the component is implemented, the domain in which the component operates, the set of applications that work together to deliver a particular service, and/or the login information and access passwords associated with the component.

In one embodiment, the orchestration engine provisions the destination environment by attaching cloned application nodes to provisioned compute nodes in the destination environment. Hence, each cloned application node executes on one or more of the provisioned compute nodes in the destination environment.

In one embodiment, the orchestration engine reconfigures the cloned application nodes in the destination environment based on the destination stack. For example, the orchestration engine determines the configurations for each node as specified by the destination stack. The orchestration engine determines whether the specified configurations match the copied configurations for a particular cloned application node. If there is no match, the orchestration engine reconfigures the particular cloned application node using the specified configurations.

Figure 4:
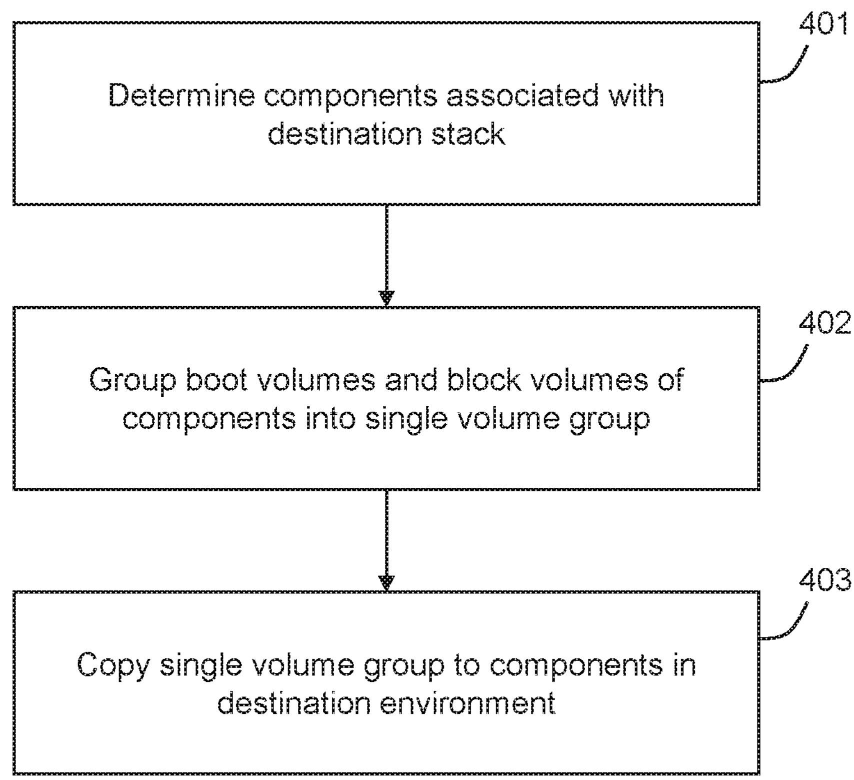
FIG. 4 illustrates an example set of operations for cloning a volume group in accordance with one or more embodiments.

When cloning one or more components or nodes from a source environment to a destination environment, the cloning engine may perform a fast cloning process by which only a subset of data from the source environment is copied. The subset of data is grouped prior to cloning, and the cloned data need not be read prior to provisioning the destination environment. FIG. 4 illustrates an example set of operations for cloning a data volume from a source specification according to an embodiment of the invention. One or more operations illustrated in FIG. 4 may be modified, rearranged, or omitted all together. Accordingly, the particular sequence of operations illustrated in FIG. 4 should not be construed as limiting the scope of one or more embodiments.

The cloning engine identifies components to be cloned. As discussed above, a user or computer system may select a subset of components or nodes from a source environment to be cloned in a destination environment (Operation 401).

The cloning engine groups data volumes, including boot and block volumes, associated with the selected subset of components or nodes, into a group volume (Operation 402). The data volumes store binary files and/or application data associated with compute nodes and/or application nodes. Binary files include executable code of a compute node and/or an application node. Application data includes data obtained by a compute node and/or an application node through an application programming interface (API) and/or user interface. Application data also includes data derived from other data obtained by a compute node and/or an application node through an application programming interface (API) and/or user interface. As an example, for an application node executing a human capital management application, application data may include names and biographical information of employees of a company, and a number of employees per office location. As another example, for an application node executing a financial management application, application data may include financial transactions of a company, and a balance of the company.

The cloning engine may group the data volumes into a group volume. In one embodiment, the cloning engine does not analyze the contents of the data volumes prior to grouping the data volumes into the group volume.

In operation 403, the single volume group consisting of the boot and block volumes of the source environment is copied into the destination environment to provision the destination environment with the boot and block volumes of the source environment. In one embodiment, the cloning engine does not analyze the contents of the group volume prior to copying the group volume to the destination specification. In one embodiment, the data having been copied is ready to be executed in the destination environment.

4. Example Embodiment of a User Interface

A detailed example of a user interface is described below for purposes of clarity. Components and/or operations described below should be understood as one specific example which may not be applicable to certain embodiments. Accordingly, components and/or operations described below should not be construed as limiting the scope of any of the claims.

Figure 5:
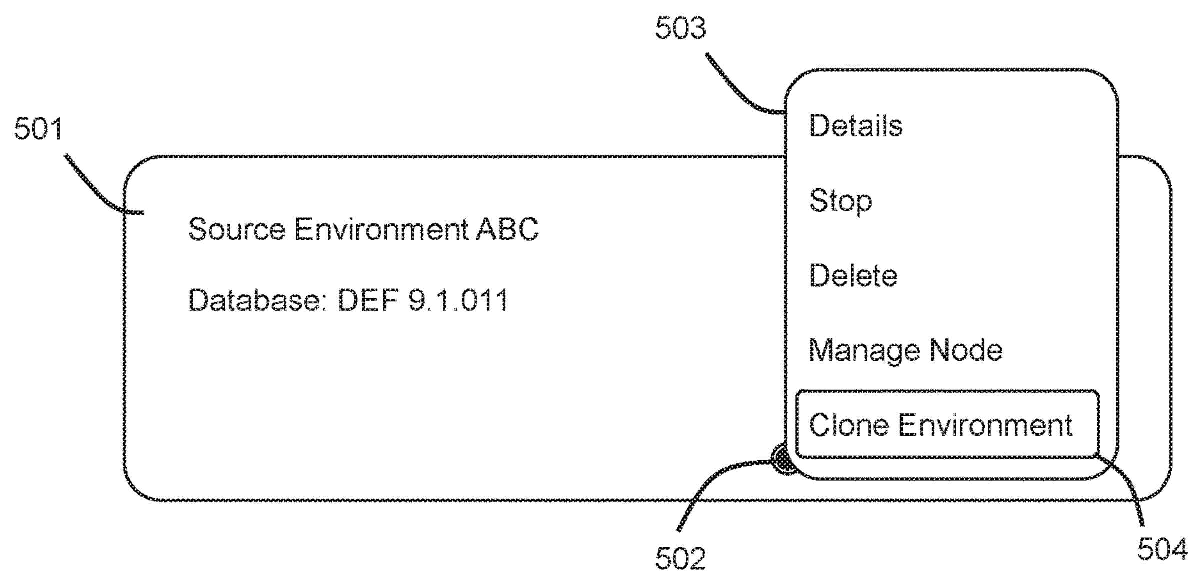
FIG. 5 illustrates a graphical user interface (GUI) for selecting a computing environment to be cloned in accordance with one or more embodiments.

FIG. 5 illustrates a graphical user interface (GUI) according to an embodiment of the invention. The user interface includes a first field 501 representing a source computing environment. The first field 501 may be displayed on a display device viewable by a user to allow the user to view information about the source environment. In the example in FIG. 5, the information about the source environment includes a name and a database associated with the source environment. Embodiments of the invention include additional types of information displayed for a user, such as a number and type of components or nodes that make up the source environment, applications and systems associated with the source environment, a status of systems in the source environment, clients associated with the source environment, as well as other information displayable for a user.

In one embodiment, the field 501 includes one or more selectable icons, images, or sub-fields. The selectable icons, images, or sub-fields may be selected by the user to display additional information or options for selection. In the embodiment shown in FIG. 5, selection of the icon 502 displays a menu 503. The menu 503 includes a plurality of selectable categories. In the embodiment displayed in FIG. 5, the selectable categories are “Details,” “Stop,” “Delete,” “Manage Node,” and “Clone Environment.” However, embodiments are not limited to these listed selectable categories, but encompass any selectable categories allowing users to view data and control characteristics of a computing environment. When a user selects the “Clone Environment” category 504, the user interface may display additional options for the user to clone the source environment, as shown in FIG. 6.

FIG. 6 illustrates a graphical user interface (GUI) having fields 601, 602, 603, 604, and 605, each representing a different component or node of a source environment. When a user interacts with the user interface to initiate cloning a computing environment, such as selecting the category “Clone Environment” in FIG. 5, a display device displays the graphical user interface of FIG. 6, presenting the user with the components or nodes that are present in the source environment, and giving the user the option to include the components or nodes in the cloned environment or omit the components or nodes from the cloned environment. For example, in FIG. 6, the component “Middle Tier B” is selected for omission from the cloned environment, while the remaining components are selected to be included in the cloned environment. Upon selecting the components or nodes to be cloned, the user may submit the cloning request, and the process previously described in FIGS. 1 and 3 may be initiated. Accordingly, a user may readily view different components or nodes of a computing environment, including information identifying the components and nodes and functions and characteristics of the components and nodes, and the user may easily select a sub-set of the components or nodes for cloning.

While example embodiments of a GUI are provided in FIGS. 5 and 6, embodiments of the invention are not limited to this specific GUI. Instead, embodiments encompass any GUI that provides information to a user regarding a source environment and allows the user to selectively include and omit components of the source environment in a cloned environment.

5. Computer Networks and Cloud Networks

In one or more embodiments, a computer network provides connectivity among a set of nodes, such as components or nodes that make up a computing environment. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as “hosts”) may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
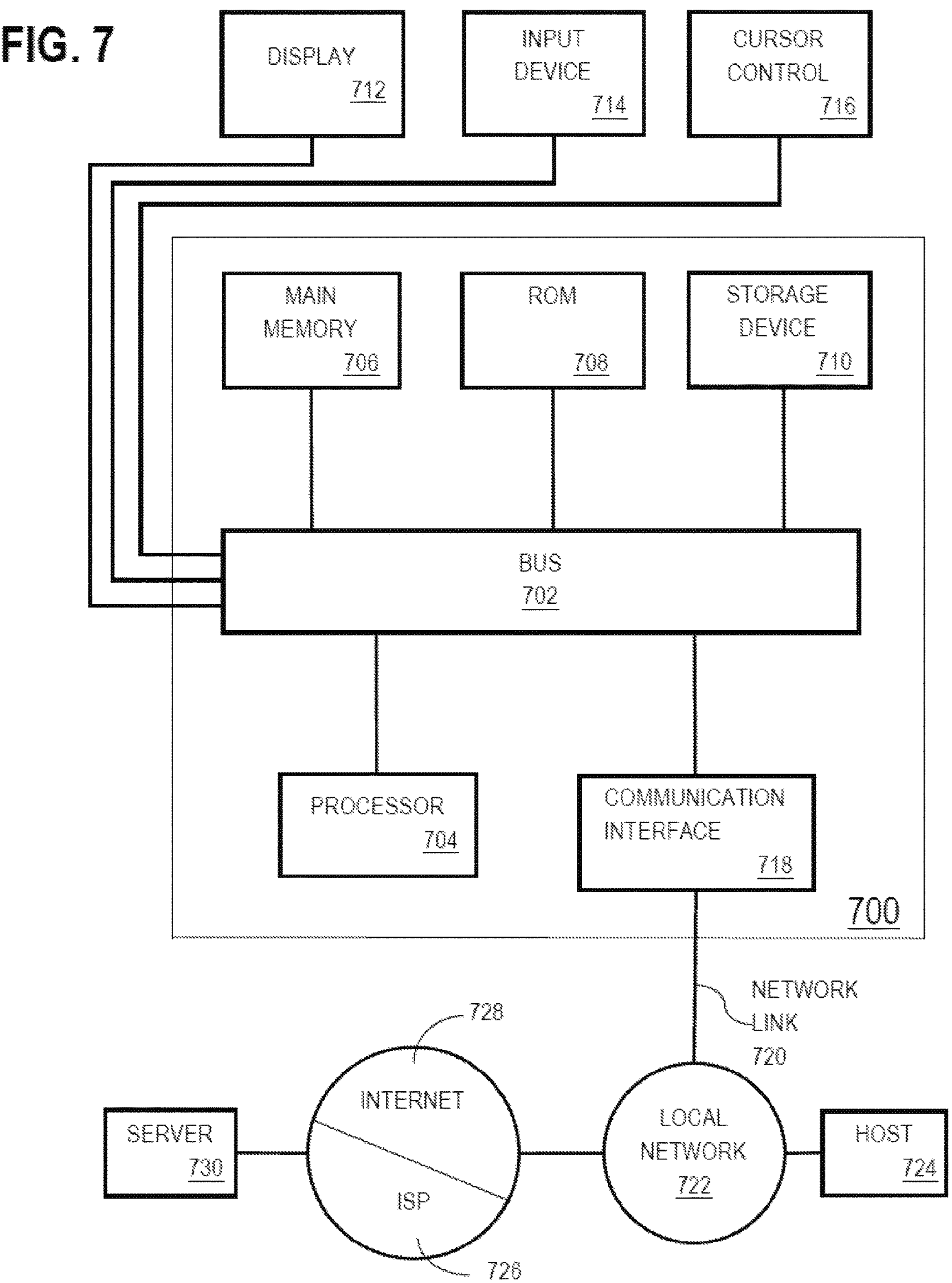
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

obtaining a source specification of a source environment, the source specification specifying a first set of characteristics of the source environment, the first set of characteristics defining (a) a first plurality of components and (b) a first set of configurations corresponding to the first plurality of components;

obtaining a source stack of a source environment, the source stack identifying hardware interconnections between hardware components in the source environment that implement the first set of characteristics defined by the source environment;

receiving a request to clone the source environment to a destination environment, the request specifying a first modification to the first set of characteristics, the first modification comprising removal of at least a first component of the first plurality of components;

generating a first destination specification for the destination environment at least by:

based on the request for the first modification, removing the first component to generate a second plurality of components for the first destination specification;

identifying a second modification for updating the first destination specification that is necessitated by the first modification, the second modification comprising at least one of:

(a) removing a second component, from the second plurality of components, that comprises a dependency relationship with the first component;

(b) modifying a storage capacity of the second plurality of components based on the removal of the first component; and (c) modifying a compute capacity of the second plurality of components based on the removal of the first component;

executing the second modification to obtain a second destination specification;

generating a destination stack, for the destination environment, based on at least one of the second destination specification and the source stack.

2. The one or more non-transitory machine-readable media of claim 1, wherein the source stack specifies addresses, ports, communication channels, and login information used by the first plurality of components in the source environment.

3. The one or more non-transitory machine-readable media of claim 1, wherein generating the destination stack includes copying hardware interconnection information from the source stack to the destination stack; and configuring the destination stack based on topology information in the second destination specification.

4. The one or more non-transitory machine-readable media of claim 1, wherein generating the destination stack comprises:

copying first portions of the source stack to the destination stack, without modifying the first portions of the source stack, wherein the first portions correspond to portions of the second destination specification that are the same as corresponding portions of the source specification, and reconfiguring only second portions of the source stack to generate third portions of the destination stack, the second portions corresponding to portions of the source specification that are modified in the second destination specification.

5. The one or more non-transitory machine-readable media of claim 1, wherein executing the instructions further cause:

deploying the destination environment based on the destination stack.

6. The one or more non-transitory machine-readable media of claim 1, wherein the first plurality of components comprises boot volumes and block volumes, wherein deploying the destination environment based on the destination stack comprises:

creating a copy of a subset of the boot volumes and block volumes corresponding to the second plurality of components; and provisioning the second plurality of components in the destination environment with the copy of the subset of the boot volumes and block volumes without modifying contents of the boot volumes and block volumes.

7. The one or more non-transitory machine-readable media of claim 6, wherein generating the destination stack does not include analyzing contents of any of the boot volumes or any of the block volumes.

8. The one or more non-transitory machine-readable media of claim 1, wherein the first modification to the first set of characteristics further comprises removal of a third component of the first plurality of components, generating the first destination specification includes removing the third component to generate the second plurality of components for the first destination specification, identifying the second modification for updating the first destination specification that is necessitated by the first modification further comprises:

adding the third component back into the second plurality of components.

9. The one or more non-transitory machine-readable media of claim 1, wherein the first component is a compute node and the second component is an application node specified in the source specification to run on the compute node.

10. One or more non-transitory machine-readable media storing instructions which, when executed by one or more processors, cause:

obtaining a source specification of a source environment, the source specification specifying a first set of characteristics of the source environment, the first set of characteristics defining (a) a first plurality of components and (b) a first set of configurations corresponding to the first plurality of components;

obtaining a source stack of a source environment, the source stack identifying hardware interconnections between hardware components in the source environment that implement the first set of characteristics defined by the source environment;

receiving a request to clone the source environment to a destination environment, the request specifying a first modification to the first set of characteristics, the first modification comprising removal of at least a first component of the first plurality of components;

comparing the request to clone the source environment with at least one of the source specification and the source stack to identify the first modification to the first set of characteristics;

identifying a second modification for updating the request to clone the source environment that is necessitated by the first modification, the second modification comprising at least one of:

(a) removing a second component, from the second plurality of components, that comprises a dependency relationship with the first component;

(b) modifying a storage capacity of the second plurality of components based on the removal of the first component; and (c) modifying a compute capacity of the second plurality of components based on the removal of the first component;

generating a destination specification based on the source specification and the first and second modifications, wherein generating the destination specification includes executing the second modification for updating the request to clone the source environment; and generating a destination stack, for the destination environment, based on the destination specification.

11. The one or more non-transitory machine-readable media of claim 10, wherein comparing the request to clone the source environment with at least one of the source specification and the source stack comprises:

generating a preliminary destination specification based on the first modification to the first set of characteristics specified in the request to clone the source environment; and comparing the preliminary destination specification with the at least one of the source specification and the source stack.

12. The one or more non-transitory machine-readable media of claim 10, wherein generating the destination stack comprises:

copying hardware interconnection information from the source stack to the destination stack; and configuring the destination stack based on topology information in the destination specification.

13. The one or more non-transitory machine-readable media of claim 10, wherein generating the destination stack comprises:

copying first portions of the source stack to the destination stack, without modifying the first portions of the source stack, wherein the first portions correspond to portions of the destination specification that are the same as corresponding portions of the source specification, and reconfiguring only second portions of the source stack to generate third portions of the destination stack, the second portions corresponding to portions of the source specification that are modified in the destination specification.

14. The one or more non-transitory machine-readable media of claim 10, wherein the first plurality of components comprises boot volumes and block volumes, and wherein generating the destination stack does not include analyzing contents of any of the boot volumes or any of the block volumes.

15. The one or more non-transitory machine-readable media of claim 10, wherein the first modification to the first set of characteristics further comprises removal of a third component of the first plurality of components, identifying the second modification for updating the request to clone the source environment that is necessitated by the first modification further comprises:

adding the third component back into the second plurality of components.

16. The one or more non-transitory machine-readable media of claim 10, wherein the first component is a compute node and the second component is an application node specified in the source specification to run on the compute node.

17. A method, comprising:

obtaining a source specification of a source environment, the source specification specifying a first set of characteristics of the source environment, the first set of characteristics defining (a) a first plurality of components and (b) a first set of configurations corresponding to the first plurality of components;

obtaining a source stack of a source environment, the source stack identifying hardware interconnections between hardware components in the source environment that implement the first set of characteristics defined by the source environment;

receiving a request to clone the source environment to a destination environment, the request specifying a first modification to the first set of characteristics, the first modification comprising removal of at least a first component of the first plurality of components;

comparing the request to clone the source environment with at least one of the source specification and the source stack to identify the first modification to the first set of characteristics;

identifying a second modification for updating the request to clone the source environment that is necessitated by the first modification, the second modification comprising at least one of:

(a) removing a second component, from the second plurality of components, that comprises a dependency relationship with the first component;

(b) modifying a storage capacity of the second plurality of components based on the removal of the first component; and (c) modifying a compute capacity of the second plurality of components based on the removal of the first component;

generating a destination specification based on the source specification, the first modification, and the second modification, wherein generating the destination specification includes executing the second modification for updating the request to clone the source environment; and generating a destination stack, for the destination environment, based on the destination specification.

18. The method of claim 17, wherein comparing the request to clone the source environment with at least one of the source specification and the source stack comprises:

generating a preliminary destination specification based on the first modification to the first set of characteristics specified in the request to clone the source environment; and comparing the preliminary destination specification with the at least one of the source specification and the source stack.

19. The method of claim 17, wherein generating the destination stack includes copying hardware interconnection information from the source stack to the destination stack; and configuring the destination stack based on topology information in the destination specification.

20. The method of claim 17, wherein generating the destination stack comprises:

copying first portions of the source stack to the destination stack, without modifying the first portions of the source stack, wherein the first portions correspond to portions of the destination specification that are the same as corresponding portions of the source specification, and reconfiguring only second portions of the source stack to generate third portions of the destination stack, the second portions corresponding to portions of the source specification that are modified in the destination specification.

21. The method of claim 17, wherein the first plurality of components comprises boot volumes and block volumes, and wherein generating the destination stack does not include analyzing contents of any of the boot volumes or any of the block volumes.

22. The method of claim 17, wherein the first modification to the first set of characteristics further comprises removal of a third component of the first plurality of components, and identifying the second modification for updating the request to clone the source environment that is necessitated by the first modification further comprises adding the third component back into the second plurality of components.

23. The method of claim 17, wherein the first component is a compute node and the second component is an application node specified in the source specification to run on the compute node.

24. An apparatus, comprising:

an environment manager configured to manage one or more computing environments, the environment manager configured to:

obtain a source specification of a source environment, the source specification specifying a first set of characteristics of the source environment, the first set of characteristics defining (a) a first plurality of components and (b) a first set of configurations corresponding to the first plurality of components; and obtain a source stack of a source environment, the source stack identifying hardware interconnections between hardware components in the source environment that implement the first set of characteristics defined by the source environment;

a cloning engine configured to:

receive a request to clone the source environment to a destination environment, the request specifying a first modification to the first set of characteristics, the first modification comprising removal of at least a first component of the first plurality of components;

obtain, from the environment manager, at least one of the source specification and the source stack;

compare the request to clone the source environment with at least one of the source specification and the source stack to identify the first modification to the first set of characteristics;

identify a second modification for updating the request to clone the source environment that is necessitated by the first modification, the second modification comprising at least one of:

(a) removing a second component, from the second plurality of components, that comprises a dependency relationship with the first component;

(b) modifying a storage capacity of the second plurality of components based on the removal of the first component; and (c) modifying a compute capacity of the second plurality of components based on the removal of the first component;

generate a destination specification based on the source specification, the first modification, and the second modification, wherein generating the destination specification includes executing the second modification for updating the request to clone the source environment; and generate a destination stack, for the destination environment, based on the destination specification; and an orchestration engine configured to receive the destination stack from the cloning engine and to provision the destination environment based on the destination stack.

* * * * *